Patented Nov. 27, 1945

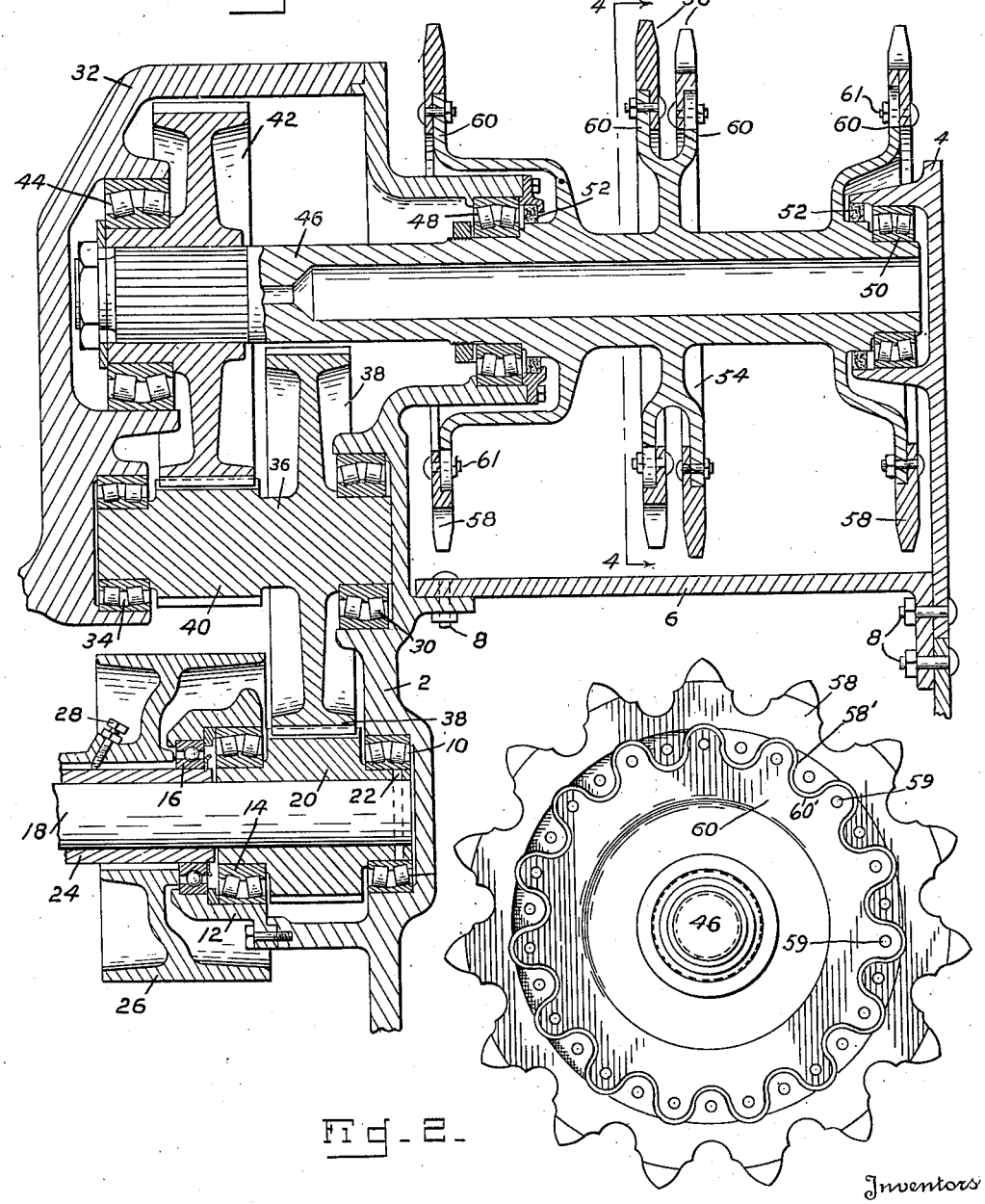

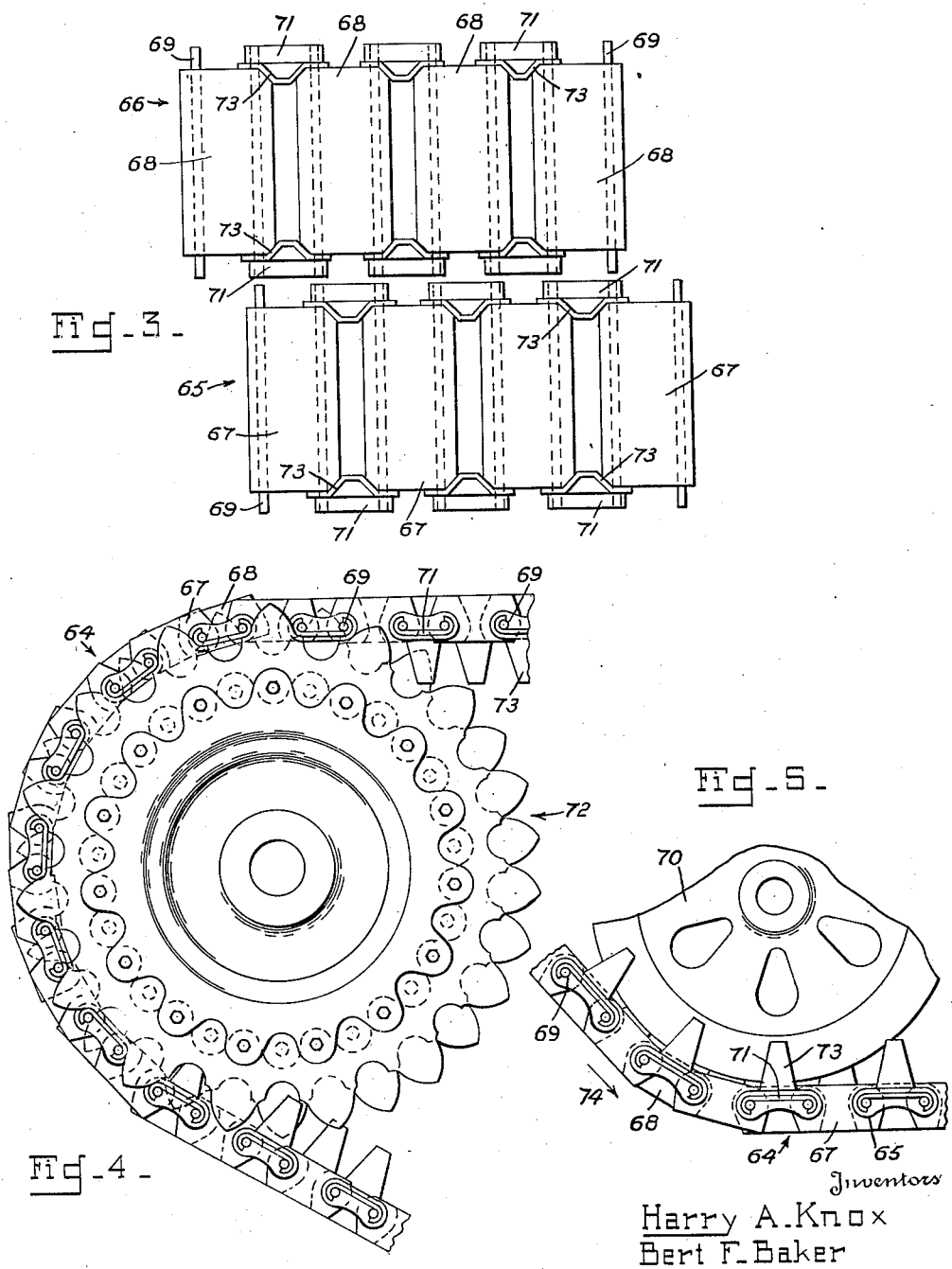

2,389,624

UNITED STATES PATENT OFFICE 2,389,624

POWER TRANSMISSION APPARATUS FOR TRACK-LAYING VEHICLES

Harry A. Knox, Washington, D. C., and Bert F. Baker, Riverdale, Md.

Application January 30, 1943, Serial No. 474,194

4 Claims. (Cl. 180—9.1)

(Granted under the act of March 3, 1883, as amended April 30, 1928; 370 O. G. 757)

The invention described herein may be manufactured and used by or for the Government for governmental purposes without the payment to us of any royalty thereon.

This invention relates to power transmission apparatus such as a reduction gear, for track laying vehicles, especially to vehicles utilizing a double track on each side and having a controlled differential for steering.

It is the object of this invention to provide a gear reduction unit for a track laying vehicle, in which the unit is rugged and simple, making for ease of manufacture, assembly and maintenance. The invention has particular application to a vehicle having a double track of the type having two spaced rows of treads or a pair of spaced and separate track units on each side, the object of which is a more smoothly operating mechanism.

Figure 1 of the drawings is a longitudinal center sectional view through a device embodying the principles of the invention.

Figure 2 is a view showing how the sprocket slips over the drum prior to being bolted in place.

Figure 3 is a fragmentary plan view of one type of track which may be used with the invention.

Figure 4 is a view in section on line 4—4 of Fig. 1.

Figure 5 is a view showing the effect of the double track with one of the halves offset.

The body 2 of a track laying vehicle is shown having joined to it a side plate 4 by a brace 6, the parts being secured by any suitable means such as bolt and nut assemblies 8.

Body 2 is recessed to receive a self-aligning frictionless bearing 10. A bracket 12 is secured to body 2, and carries a self-aligning frictionless bearing 14. Spaced from bearing 14 in the bracket is another frictionless bearing 16. A power shaft 18 drives a power gear 20 by means of a key pin 22. The gear 20 runs in the self-aligning bearings 10 and 14. Concentric with shaft 18 is a sleeve 24 which is supported in bearing 16. A track brake drum 26 is shown mounted on sleeve 24, and is prevented from rotating relatively to the sleeve by a set screw 28.

Sleeve 24 and shaft 18 form part of a controlled differential, not shown in the drawings. However, the differential is in all respects similar to the one shown in U. S. Patent 2,245,595, issued June 17, 1941 to Harry A. Knox. The description of the differential is in the patent and need not be repeated here.

Another frictionless self-aligning bearing 30 is positioned in body 2. A casing 32 is secured to the body by means not shown. In casing 32 is mounted, opposite bearing 30, another frictionless self-aligning bearing 34. Bearings 30 and 34 support a countershaft 36. Integral with the countershaft and meshing with the power gear is a countershaft gear 38, which is larger than the power gear to provide a speed reduction. The speed reduction is furthered by another gear 40, also preferably integral with countershaft 36, and smaller than gear 38. Gear 40 drives a larger gear 42 which runs in a frictionless self-aligning bearing 44 and is splined to shaft 46 to drive the shaft. Shaft 46 runs in self-aligning frictionless bearings 48 and 50 disposed in body 2 and side plate 4 respectively. Any suitable oil seal 52 may be provided to prevent leak of lubricant from the space occupied by bearings 48 and 50.

A track drive sprocket hub 54 is formed integral with drive shaft 46. The hub may be formed with integral sprocket teeth, or the teeth may be made of a wear-resistant alloy as shown at 58 bolted to the sporcket. It is evident that the largest outside diameter of the hub flanges is greater than the smallest inside diameter of the sprockets. The form taken by the hub flanges and sprockets to enable slipping the sprockets over the flanges and yet permit assembling them together by bolting, is shown in Figure 2. It is here shown that the inside periphery of the sprocket ring is provided with equally spaced lugs 58'; the hub flanges 60 are provided with equally spaced recesses 60', and in such a manner that any lug of the one part will pass through any two adjacent recesses of the other. Thus, a sprocket ring may be slipped over several hub flanges from the tank exterior by inter-fitting the lugs as shown in Fig. 2. For bolting to any given flange, the sprocket is merely turned right or left to bring the holes 59 into registry, after which bolts 61 may be passed through the holes.

In Figure 3 is shown a portion of a double track 64 suitable for use in connection with the construction shown in Figure 1. In the present instance the double track 64 is shown as comprising two laterally spaced track units 65 and 66. Track units 65 and 66 have treads 67 and 68 respectively, arranged in staggered relation to each other. Each tread has a pair of pins 69 extending beyond the ends thereof. End connectors 71 are provided to interconnect the pins of adjacent treads, and have flanges 73 adapted to engage track idlers to guide the track. The sprockets, hub, and rings are adapted to be used with either a double track having two spaced and separate track units, as shown; or with a double track having two spaced rows of treads which are connected to each other.

Fig. 4 shows the sprockets of the two track units, illustrating the feature whereby one unit of the track is offset relatively to the other unit. The amount of offset is half the distance between two teeth. With this arrangement, the gap between any two adjacent treads 67 of the track unit 65 is bridged by a tread 68 of the track unit 66.

The advantage of this arrangement is best apparent from a consideration of Fig. 5. Here is shown the forward ground idler wheel 70, it being assumed that the vehicle normally moves in the direction of the arrow 72. Relatively to the vehicle, the track then moves in the direction of the arrow 74. The tread 67 of the track unit 65 is about to engage the ground. However, the gap between adjacent treads 67 is bridged by tread 68 of the track unit 66, which is already on the ground. From this figure, it can be seen that the offset feature serves to reduce materially the vibration caused by the separate treads striking the ground in sequence.

In view of the similarity between the formation of the inner periphery of the sprocket rings and the outer periphery of the hub portions, it would obviously be just as accurate to say that the lugs were carried by the hub portions and the recesses by the ring portions, but for convenience of description this order is reversed.

We claim:

1. In a power transmission apparatus for a track-laying vehicle having a double track on each side, a driving shaft at each side of the vehicle, inner, outer and intermediate sprocket hubs carried by each shaft, a single sprocket ring mounted on each of the inner and outer hubs, a pair of closely adjacent sprocket rings mounted on the intermediate hub, aligned teeth on the sprocket ring on the inner hub and the sprocket ring on the intermediate hub which is directly opposite the sprocket ring on the inner hub, aligned sprocket teeth on the outer hub and the other sprocket ring on the intermediate hub, said last mentioned aligned sprocket teeth being staggered in relation to said first mentioned sprocket teeth, whereby the treads of the tracks mounted on said sprocket rings are caused to strike the ground in staggered sequence.

2. In a power transmission apparatus for a track-laying vehicle having a double track on each side, a driving shaft at each side of the vehicle, inner, outer and intermediate sprocket hubs carried by each shaft, each hub being provided with radial peripheral recesses staggered with relation to the recesses in the other hubs, sprocket rings having lugs on their inner peripheries and receivable in said recesses, one of said sprocket rings being provided on each of said inner and outer hubs and two closely adjacent sprocket rings being provided on said intermediate hub, aligned teeth on the sprocket ring on the inner hub and the sprocket ring on the intermediate hub which is directly opposite the sprocket ring on the inner hub, aligned sprocket teeth on the outer hub and the other sprocket ring on the intermediate hub, said last mentioned aligned sprocket teeth being staggered in relation to said first mentioned sprocket teeth, whereby the treads of the tracks mounted on said sprocket rings are caused to strike the ground in staggered sequence.

3. The invention of claim 2, characterized in that the recesses of the sprocket hubs and the lugs on the sprocket rings are so shaped and sized that the rings may be slipped laterally freely over said hubs.

4. The invention of claim 2, characterized in that the hubs are provided with apertures on each side of the recesses and the lugs on the sprocket rings are similarly provided for the passage of means for detachably securing the hubs and rings together.

BERT F. BAKER.
HARRY A. KNOX.